(12) United States Patent
Ishii et al.

(10) Patent No.: US 9,338,426 B2
(45) Date of Patent: May 10, 2016

(54) THREE-DIMENSIONAL IMAGE PROCESSING APPARATUS, THREE-DIMENSIONAL IMAGING APPARATUS, AND THREE-DIMENSIONAL IMAGE PROCESSING METHOD

(75) Inventors: Yasunori Ishii, Osaka (JP); Khang Nguyen, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 303 days.

(21) Appl. No.: 13/879,710

(22) PCT Filed: Oct. 26, 2011

(86) PCT No.: PCT/JP2011/005955
§ 371 (c)(1),
(2), (4) Date: Apr. 16, 2013

(87) PCT Pub. No.: WO2012/056685
PCT Pub. Date: May 3, 2012

(65) Prior Publication Data
US 2013/0208088 A1  Aug. 15, 2013

(30) Foreign Application Priority Data

Oct. 27, 2010  (JP) ................................. 2010-240460

(51) Int. Cl.
*H04N 13/00* (2006.01)
*G03B 35/00* (2006.01)
(Continued)

(52) U.S. Cl.
CPC ............ *H04N 13/0018* (2013.01); *G03B 35/00* (2013.01); *G03B 35/08* (2013.01);
(Continued)

(58) Field of Classification Search
CPC ........ G03B 35/00; G03B 35/08; G03B 35/18; H04N 13/0271; H04N 13/0018; H04N 13/0022; H04N 13/0207; G06T 19/00
See application file for complete search history.

(56) References Cited

U.S. PATENT DOCUMENTS 6,496,598 B1 *  12/2002  Harman ............. H04N 13/0022
                                                  348/E13.004
8,009,903 B2    8/2011  Ojima et al.
(Continued)

FOREIGN PATENT DOCUMENTS

JP   11-266388    9/1999
JP   2003-209858  7/2003
(Continued)

OTHER PUBLICATIONS

Office Action with search report issued Oct. 16, 2014 in corresponding Chinese patent application No. 201180051266.3 (with English translation of search report).
(Continued)

*Primary Examiner* — Jefferey Harold
*Assistant Examiner* — Sean Haiem
(74) *Attorney, Agent, or Firm* — Wenderoth, Lind & Ponack, L.L.P.

(57) ABSTRACT

A three-dimensional image processing apparatus which processes a captured image of a scene using distance information indicating a distance of the scene from a camera, and includes: a distance designation unit which receives input of a designated distance that is a target distance in which a stereoscopic effect is to be emphasized; a distance conversion unit which converts the distance indicated in the distance information into a stereoscopic distance for generating three-dimensional images, to emphasize the stereoscopic effect of the scene in the designated distance; and an emphasized image generation unit which, by processing the captured image based on the stereoscopic distance, generates an emphasized image representing the stereoscopic effect to be emphasized in the designated distance.

9 Claims, 12 Drawing Sheets

(51) Int. Cl.
*G03B 35/08* (2006.01)
*G03B 35/18* (2006.01)
*G06T 19/00* (2011.01)
*H04N 13/02* (2006.01)

(52) U.S. Cl.
CPC .............. *G03B 35/18* (2013.01); *G06T 19/00* (2013.01); *H04N 13/0022* (2013.01); *H04N 13/0207* (2013.01); *H04N 13/0271* (2013.01)

(56) References Cited

U.S. PATENT DOCUMENTS

| | | | |
|---|---|---|---|
| 8,120,606 B2 | 2/2012 | Nakamura et al. | |
| 2007/0024614 A1* | 2/2007 | Tam | G06T 7/0067 345/419 |
| 2008/0002910 A1* | 1/2008 | Ojima | G09G 5/00 382/277 |
| 2009/0002365 A1* | 1/2009 | Kurabayashi | G06T 5/002 345/419 |
| 2009/0148038 A1* | 6/2009 | Sawachi | G06T 7/0075 382/154 |
| 2009/0207282 A1* | 8/2009 | Sasaki | H04N 5/2621 348/240.3 |
| 2010/0103311 A1* | 4/2010 | Makii | G06T 7/0057 348/369 |
| 2011/0025829 A1* | 2/2011 | McNamer | H04N 13/021 348/50 |
| 2011/0292045 A1* | 12/2011 | Nakamura | G03B 35/08 345/419 |
| 2013/0051660 A1 | 2/2013 | Shibuhisa et al. | |

FOREIGN PATENT DOCUMENTS

| | | |
|---|---|---|
| JP | 2007-110360 | 4/2007 |
| JP | 2007-124282 | 5/2007 |
| JP | 2008-33897 | 2/2008 |
| JP | 2009-59113 | 3/2009 |
| JP | 2009-162747 | 7/2009 |
| JP | 2009-162748 | 7/2009 |
| JP | 2009-163716 | 7/2009 |
| JP | 2009-163717 | 7/2009 |
| JP | 2009-163718 | 7/2009 |
| JP | 2010-16743 | 1/2010 |
| JP | 2010-206774 | 9/2010 |
| JP | 2011-250059 | 12/2011 |
| WO | 2010/070545 | 6/2010 |

OTHER PUBLICATIONS

International Search Report issued Jan. 17, 2012 in International (PCT) Application No. PCT/JP2011/005955.

Masatoshi Okutomi et al., "A Multiple-Baseline Stereo," IEEE Transactions on Pattern Analysis and Machine Intelligence, vol. 15, No. 4, Apr. 1993, pp. 353-363.

Liang Zhang et al., "Stereoscopic Image Generation Based on Depth Images", IEEE Transactions on Broadcasting, vol. 51, No. 2, Jun. 2005.

Robert J. Woodham, "Photometric Method for Determining Surface Orientation from Multiple Images", Optical Engineering, vol. 19, No. 1, Jan./Feb. 1980, pp. 139-144.

Alex Paul Pentland, "A New Sense for Depth of Field", IEEE Transactions on Pattern Analysis and Machine Intelligence, vol. PAMI-9, No. 4, Jul. 1987.

Murali Subbarao et al., "Depth from Defocus: A Spatial Domain Approach", International Journal of Computer Vision, vol. 13, No. 3, Dec. 1994.

Hirokazu Yamanoue et al., "Geometrical analysis on Puppet theater effect and Cardboard effect in stereoscopic images", The Institute of Electronics, Information and Communication Engineers, Technical report of IEICE., HIP101(227), p. 15-22, Jul. 19, 2001, with English translation.

Office Action with search report issued Feb. 16, 2015 in corresponding Chinese patent application No. 201180051266.3 (with English translation of search report).

Chinese Office Action with Search Report issued Jul. 21, 2015 in corresponding Chinese patent application No. 201180051266.3 (with partial English translation of Search Report).

* cited by examiner

|  | Ls | dc | de | α | β | Lc |
|---|---|---|---|---|---|---|
| Condition 1 | 4.5 | 65 | 120 | 33.4 | 33.4 | 4 |
| Condition 2 | 4.5 | 32.5 | 120 | 43.6 | 33.4 | 1.8 |
| Condition 3 | 4.5 | 125 | 125 | 43.6 | 33.4 | 6.1 |

(a)

(b)

THREE-DIMENSIONAL IMAGE PROCESSING APPARATUS, THREE-DIMENSIONAL IMAGING APPARATUS, AND THREE-DIMENSIONAL IMAGE PROCESSING METHOD

TECHNICAL FIELD

The present invention relates to a three-dimensional image processing apparatus and a three-dimensional image processing method each for processing a captured image of a scene using distance information indicating a distance of the scene from a camera, and relates to a three-dimensional imaging apparatus which includes the three-dimensional image processing apparatus.

BACKGROUND ART

Recent years have seen remarkable improvement in function and performance of digital still cameras or digital video cameras which use solid-state imaging devices (which may hereinafter be referred to simply as "imaging device") such as charge coupled device (CCD) image sensors or complementary metal oxide semiconductor (CMOS) image sensors. Particularly, along with the development of semiconductor manufacturing technology, the solid-state imaging devices have finer and finer pixel structures.

This results in an attempt to improve the integration of pixels and drive circuits in solid-state imaging devices. Thus, the number of pixels in an imaging device has increased significantly from approximately one million pixels to ten million pixels or more within a small number of years. Furthermore, the quality of images obtained through an imaging process has been dramatically enhanced.

Meanwhile, thin display apparatuses such as liquid-crystal displays or plasma displays have enabled display of high-definition and high-contrast images while taking up little space. Such a tendency of improvement in image quality is now expanding from two-dimensional images to three-dimensional images. Nowadays, a three-dimensional display apparatus has begun to be developed which displays high-quality three-dimensional images using a pair of polarized glasses or high-speed shutter glasses.

Development of a three-dimensional imaging apparatus for obtaining high-quality three-dimensional images or video to be displayed on the three-dimensional display apparatus has also been advancing. A conceivable simple method of obtaining three-dimensional images and displaying them on the three-dimensional display apparatus is capturing images or video by means of an imaging apparatus which includes two optical systems (a lens and an imaging device) different in position. The images captured using the respective optical systems are input to the three-dimensional display apparatus as a left-eye image and a right-eye image. With the three-dimensional display apparatus switching fast between and displaying the captured left-eye and right-eye images, a user wearing a pair of glasses can be given stereoscopic vision from the three-dimensional images.

There is a method of generating a left-eye image and a right-eye image based on texture information and depth information of a scene which is calculated using an imaging system including a plurality of cameras. There is also a method of generating a left-eye image and a right-eye image by calculating depth information based on a plurality of images captured by one camera in different scene conditions or different conditions of an optical system in an imaging apparatus.

The former method includes a multi-baseline stereo method disclosed by Non Patent Literature (NPL) 1 in which images captured by a number of cameras are utilized at the same time to determine a depth of each pixel. This multi-baseline stereo method is known for accurate depth estimation of a scene compared to commonly-used twin-lens stereo.

As an example, a method of generating a left-eye image and a right-eye image (disparity images) using two cameras (twin-lens stereo) is described. In the case of twin-lens stereo, two images are captured from viewpoints different from each other using two cameras, then, from each of the captured images, a feature point is extracted, and a feature-to-feature correspondence relationship is determined to specify corresponding points. The distance between the corresponding points thus specified is referred to as a disparity. For example, when coordinates (x, y) of corresponding feature points of two images captured with two cameras are (5, 10) and (10, 10), the disparity is 5. Assume here that the cameras are placed in parallel, the distance from the cameras to an object is determined by (Expression 1) where d is a disparity, f is a focal length of the two cameras, and B is a distance between the cameras (i.e., baseline).

[MATH. 1]

$$Z = \frac{-Bf}{d} \quad \text{(Expression 1)}$$

An increased distance between the two cameras may lead to a failure of one of the cameras to observe a feature point observed with the other camera. Even in such a case, the disparity estimation error is reduced in the multi-baseline stereo method because three or more cameras are used, which allows reduction in ambiguity of the search for corresponding points.

Once the depth is determined, it becomes possible to generate a left-eye image and a right-eye image using depth information and scene texture as in the method disclosed by Non Patent Literature (NPL) 2, for example. According to the method disclosed by NPL 2, an image whose viewpoint is at a new position, that is, a virtual camera position (including a left-eye camera position and a right-eye camera position) can be generated using the estimated depth and the scene texture obtained form the imaging apparatus. By doing so, it is possible to obtain an image from a viewpoint different from a viewpoint of the shooting.

The image from the new viewpoint can be generated using (Expression 2). This expression uses the same denotation as (Expression 1). Assume that xc is the x-coordinate of the camera from which the depth was determined, and xl and xr are each the x-coordinate of the camera located at the viewpoint position which is newly generated. Here, xl and xr are the x-coordinate of the left-eye camera (virtual camera) and the x-coordinate of the right-eye camera (virtual camera), respectively. The distance between the virtual cameras (i.e., baseline) is denoted by tx.

[MATH. 2]

$$xl = xc + \frac{txf}{2Z} \quad \text{(Expression 2)}$$

$$xr = xc - \frac{txf}{2Z}$$

Thus, it is possible to generate a left-eye image and a right-eye image by calculating the depth using a plurality of cameras.

The latter depth calculation method includes photometric stereo disclosed by Non Patent Literature (NPL) 3, as a method of changing a scene-related condition. When a plurality of images of an object captured with lighting at different positions is input, a three-dimensional position of the object is determined by the three-dimensional relationship between the pixel values of the object and the positions of the lighting. In addition, a method of changing an optical condition of an imaging apparatus includes a depth from defocus method disclosed by Non Patent Literature (NPL) 4. In this method, the distance (depth) from the camera to the object can be determined using a change amount of blur at each pixel in a plurality of images captured with a camera with different focal lengths, the focal lengths of the camera, and a size of an aperture (an opening size). Thus, various methods of obtaining three-dimensional information about a scene have been long studied.

Using left-eye and right-eye images generated using the depth information obtained in the above-described method, it is possible to display three-dimensional images. Particularly, three-dimensional display has recently become possible even on home-use liquid crystal displays or plasma displays. Furthermore, in consumer application, capturing and displaying three-dimensional images have also become possible.

By capturing images or video using a three-dimensional imaging apparatus, it is possible to obtain depth information of an object. Thus, when the images or video captured with the three-dimensional imaging apparatus are displayed through a three-dimensional display apparatus, it is possible to display images or video which achieves a stereoscopic effect as well as looks real. However, especially a photographer using a consumer three-dimensional imaging apparatus has no skill or know-how for capturing images or video which achieves a stereoscopic effect. The images or video captured by such a photographer barely achieves a stereoscopic effect, resulting in little merit as three-dimensional images.

Meanwhile, as a process related to a distance (depth) of a scene, a method of changing a resolution allocated to a distance has been proposed (see NPLs 1 to 5, for example). The techniques disclosed by these NPLs 1 to 5 allow reduction in the amount of three-dimensional data by changing an allocation of a resolution with respect to a distance.

CITATION LIST

Patent Literature

[PTL 1] Japanese Unexamined Patent Application Publication No. 2009-162747
[PTL 2] Japanese Unexamined Patent Application Publication No. 2009-162748
[PTL 3] Japanese Unexamined Patent Application Publication No. 2009-163716
[PTL 4] Japanese Unexamined Patent Application Publication No. 2009-163717
[PTL 5] Japanese Unexamined Patent Application Publication No. 2009-163718
[PTL 6] Japanese Unexamined Patent Application Publication No. 2010-16743

Non Patent Literature

[NPL 1] "A Multiple-baseline Stereo," IEEE Trans. Pattern Analysis and Machine Intelligence, Vol. 15, No. 4, pp. 353-363, 1993, M. Okutomi and T. Kanade.
[NPL 2] "Stereoscopic Image Generation Based on Depth Images for 3D TV." IEEE Trans. On Broadcasting, Vol. 51, No. 2, June 2005, L. Zhang and W. J. Tam.
[NPL 3] "Photometric method for determining surface orientation from multiple images." Optical Engineerings 19, I, 139-144, 1980, R. J. Woodham.
[NPL 4] "A new sense for depth of field", IEEE Transaction on Pattern Analysis and Machine Intelligence, 2, 4, pp. 523-531 1987, A. P. Pentland.
[NPL 5] "Depth from Defocus: A Spatial Domain Approach," International Journal of Computer Vision, Vol. 13, No. 3, pp. 271-294, 1994 M. Subbarao and G. Surya.
[NPL 6] "Geometrical Analysis of Puppet Theater and Cardboard Effects in Stereoscopic Images" The Institute of Electronics, Information, and Communication Engineers (IEICE), HIP, Human Information Processing 101 (227), 15-22, 2001, Yuichi Yamanoue, et al.

SUMMARY OF INVENTION

Technical Problem

However, the above-described conventional methods have a problem that although the data amount can be reduced, an improvement on the stereoscopic effect of a captured image, such as emphasizing the stereoscopic effect of a desired object, is not possible.

Thus, an object of the present invention is to provide a three-dimensional image processing apparatus and a three-dimensional image processing method each of which solves the above-described conventional problem and allows an improvement on a stereoscopic effect of a captured image of a scene using distance information indicating a distance of the scene from a camera, as well as to provide a three-dimensional imaging apparatus which includes the three-dimensional image processing apparatus.

Solution to Problem

In order to achieve the above object, the three-dimensional image processing apparatus according to an aspect of the present invention is a three-dimensional image processing apparatus which processes a captured image of a scene using distance information indicating a distance of the scene from a camera, the three-dimensional image processing apparatus comprising: a distance designation unit configured to receive input of a designated distance that is a target distance in which a stereoscopic effect is to be emphasized; a distance conversion unit configured to convert the distance indicated in the distance information into a stereoscopic distance for generating three-dimensional images, to emphasize the stereoscopic effect of the scene in the designated distance; and an emphasized image generation unit configured to generate an emphasized image by processing the captured image based on the stereoscopic distance, the emphasized image representing the stereoscopic effect to be emphasized in the designated distance.

With this structure, the distance indicated in the distance information can be converted into a stereoscopic distance so that the stereoscopic effect of a scene in a designated distance is emphasized. Consequently, even an image captured by a photographer who is not used to taking three-dimensional images can result in an image with a desired object stereoscopically emphasized therein.

Furthermore, with this structure, the captured image is processed based on the stereoscopic distance to generate an emphasized image which represents a stereoscopic effect to be emphasized in the designated distance. Accordingly, a photographer can check a degree of emphasis of a stereoscopic effect by looking at the emphasized image displayed during a shooting. As a result, it becomes possible to effectively improve a stereoscopic effect of a captured image.

Furthermore, it is preferred that the emphasized image generation unit be configured to generate the emphasized image by processing the captured image to cause more blur to be included in a region where a difference between the designated distance and the stereoscopic distance is greater.

With this structure, it is possible to generate an emphasized image by processing a captured image so that a region where the difference between the designated distance and the stereoscopic distance is greater has more blur. In other words, the emphasized image can be generated as a two-dimensional image. Therefore, the three-dimensional display apparatus is not always needed to display the emphasized image, with the result that the structure of the imaging apparatus can be simplified, for example.

Furthermore, it is preferred that the emphasized image generation unit be configured to generate the emphasized image by (i) performing a restoration process on the captured image using blur information to generate a restored image and (ii) adding more blur to a region of the restored image where the difference between the designated distance and the stereoscopic distance is greater, the blur information indicating a feature of blur in the captured image.

With this structure, it is possible to generate an emphasized image by adding blur to a restored image generated by performing a restoration process on the captured image. The occurrence of a decrease in visibility of a stereoscopic effect by blur included in the captured image can therefore be reduced.

Furthermore, it is preferred that the three-dimensional image processing apparatus further comprise a disparity image generation unit configured to generate disparity images as the three-dimensional images based on the captured image, the disparity images having a disparity which depends on the stereoscopic distance.

With this structure, it is possible to generate disparity images having a disparity which depends on the stereoscopic distance. Thus, the scene can be displayed stereoscopically using a three-dimensional display apparatus.

Furthermore, it is preferred that the distance conversion unit be configured to convert the distance indicated in the distance information into the stereoscopic distance using a conversion expression which represents the stereoscopic distance as a function of the distance indicated in the distance information, and a rate of change of the function in the designated distance be greater than 1.

With this structure, the distance indicated in the distance information can be converted into the stereoscopic distance using a conversion expression which represents the stereoscopic distance as a function of the distance indicated in the distance information. At this time, the rate of change of the function in the designated distance is greater than 1, and in the designated distance, the change amount of the stereoscopic distance therefore becomes greater than the change amount of the distance indicated in the distance information. Thus, the distance indicated in the distance information can easily be converted into the stereoscopic distance using the conversion expression so that the stereoscopic effect of the scene in the designated distance is emphasized.

Furthermore, it is preferred that the distance conversion unit be configured to convert the distance indicated in the distance information into the stereoscopic distance using a conversion expression which gives a highest rate of change in the designated distance among conversion expressions held in advance.

With this structure, the distance indicated in the distance information can be converted into the stereoscopic distance using the conversion expression which is suited to emphasizing the stereoscopic effect in the designated distance among conversion expressions held in advance.

Furthermore, the three-dimensional image processing apparatus may be configured as an integrated circuit.

Furthermore, the three-dimensional imaging apparatus according to an aspect of the present invention comprises: the three-dimensional image processing apparatus; an imaging unit configured to capture an image of the scene; and a display unit configured to display the emphasized image.

With this, effects the same as the above-described three-dimensional image processing apparatus can be produced.

It is to be noted that the present invention can be implemented not only as the above three-dimensional image processing apparatus, but also as a three-dimensional image processing method which includes, as steps, the operations of characteristic structural elements included in the above three-dimensional image processing apparatus. Furthermore, the present invention can also be implemented as a program which causes a computer to execute each step included in the three-dimensional image processing method. In addition, it goes without saying that the program can be distributed via a non-transitory recording medium such as a compact disc read only memory (CD-ROM) or a transmission medium such as the Internet.

Advantageous Effects of Invention

According to the present invention, the stereoscopic effect of a captured image of a scene can be improved using distance information indicating a distance of the scene from a camera.

DESCRIPTION OF EMBODIMENTS

The following shall describe an embodiment of the present invention with reference to the drawings. It is to be noted that each embodiment described below shows a preferred specific example of the present invention. Specifically, the numerical values, shapes, materials, structural elements, the arrangement and connection of the structural elements, steps, the order of steps, etc. shown in the embodiment below are an example of the present invention and do not limit the present invention. The present invention is defined based on the descriptions in the scope of Claims. Therefore, among the structural elements in the embodiment below, structural elements not recited in any of the independent claims indicating the broadest concept of the present invention are not necessarily required to achieve the goal of the present invention, but are described as structural elements in a more preferred embodiment.

In the following descriptions, a signal or information indicating an image may be referred to simply as "image".

Figure 1:
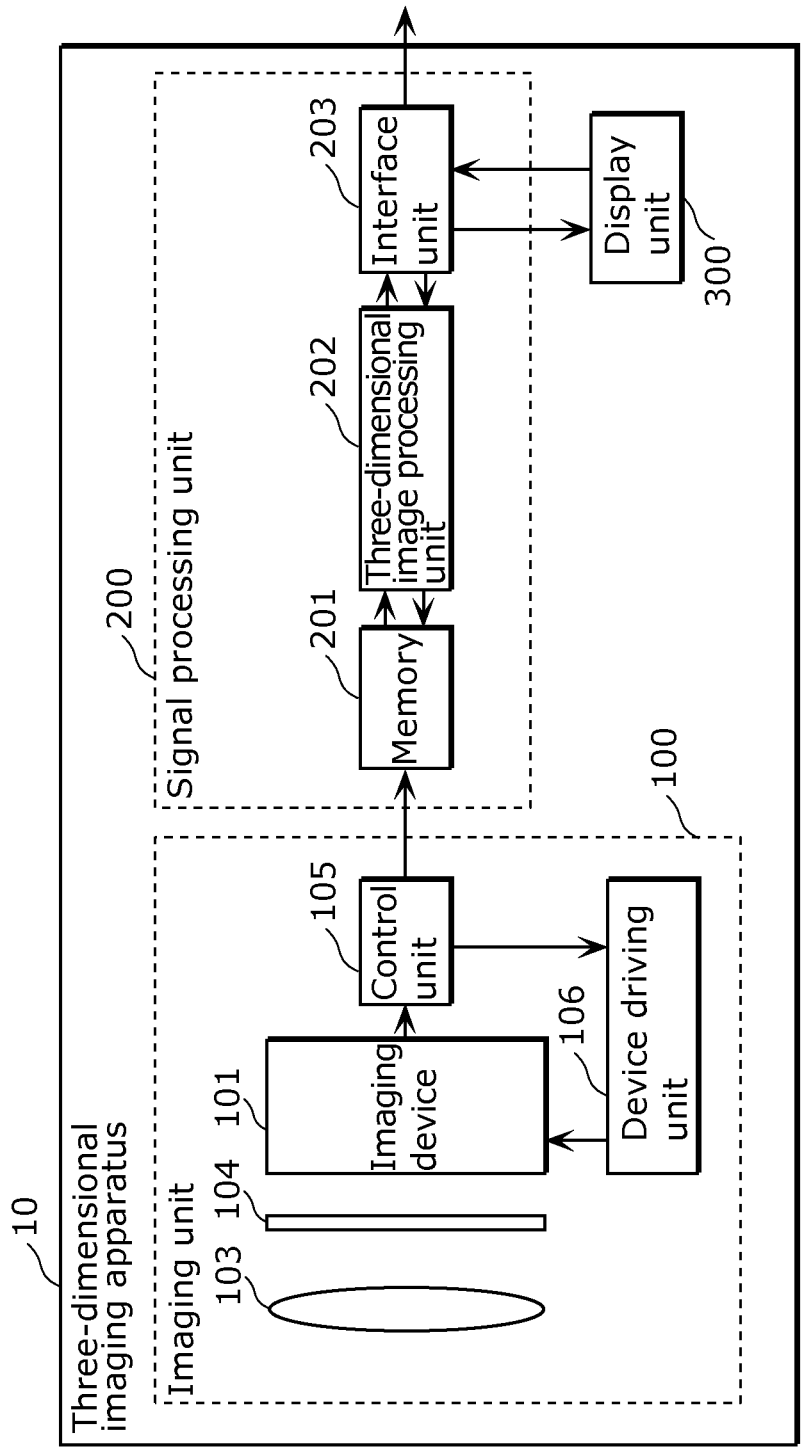
FIG. 1 shows an overall structure of a three-dimensional imaging apparatus in an embodiment of the present invention.

FIG. 1 is a block diagram showing an overall structure of a three-dimensional imaging apparatus 10 in an embodiment of the present invention. The three-dimensional imaging apparatus 10 in this embodiment is a digital electronic camera and includes an imaging unit 100, a signal processing unit 200, and a display unit 300. The imaging unit 100, the signal processing unit 200, and the display unit 300 are described in detail below.

The imaging unit 100 captures an image of a scene. The scene means everything in the image captured by the imaging unit 100 and includes a background in addition to an object.

As shown in FIG. 1, the imaging unit 100 includes an imaging device 101, an optical lens 103, a filter 104, a control unit 105, and a device driving unit 106.

The imaging device 101 is a solid-state imaging device, such as a CCD image sensor or a CMOS image sensor, and is manufactured using a known semiconductor manufacturing technology. For example, the imaging device 101 includes a plurality of light sensing cells arranged in a matrix on an imaging area.

The optical lens 103 forms an image on the imaging area of the imaging device 101. Although the imaging unit 100 includes one optical lens 103 in this embodiment, a plurality of optical lenses may be included.

The filter 104 is an infrared cut filter which passes visible light and blocks near-infrared light (IR). It is to be noted that the imaging unit 100 does not always need to include the filter 104.

The control unit 105 generates a primitive signal for driving the imaging device 101. Furthermore, the control unit 105 receives an output signal from the imaging device 101 and transmits the signal to the signal processing unit 200.

The device driving unit 106 drives the imaging device 101 based on the primitive signal generated by the control unit 105.

It is to be noted that these control unit 105 and the device driving unit 106 each include large scale integration (LSI) such as a CCD driver, for example.

The signal processing unit 200 generates a signal indicating an image (an image signal) based on the signal transmitted from the imaging unit 100. As shown in FIG. 1, the signal processing unit 200 includes a memory 201, a three-dimensional image processing unit 202, and an interface unit 203.

The three-dimensional image processing unit 202 processes the captured image of the scene using distance information indicating a distance of the scene from the camera. This three-dimensional image processing apparatus 202 can be preferably implemented by a combination of hardware, such as a known digital signal processing processor (DSP), with software which executes image processing including an image signal generation process. Details of the three-dimensional image processing unit 202 will be described later with reference to the drawings.

The memory 201 includes a dynamic random access memory (DRAM), for example. On the memory 201, the signal obtained from the imaging unit 100 is recorded, and image data generated by the three-dimensional image processing unit 202 or data obtained by compressing the image data is temporarily recorded. This image data is transmitted to a recording medium (not shown), the display unit 300, or the like, through the interface unit 203.

The display unit 300 displays an image-capturing condition, a captured image, or the like. Furthermore, the display unit 300 is a touch panel, such as a capacitive touch panel or a resistive touch panel, and also functions as an input unit which receives input from a user. Information entered by a user is reflected in the control of the signal processing unit 200 and the imaging unit 100 through the interface unit 203.

Furthermore, the display unit 300 displays the emphasized image generated by the signal processing unit 200. In this embodiment, the display unit 300 is not required to be capable of stereoscopically displaying three-dimensional images (for example, disparity images).

The three-dimensional imaging apparatus 10 in this embodiment further includes known structural elements such as an electronic shutter, a viewfinder, a power source (battery), and a flash, but descriptions on these elements are not very necessary to understand the present invention and therefore are omitted.

Figure 2:
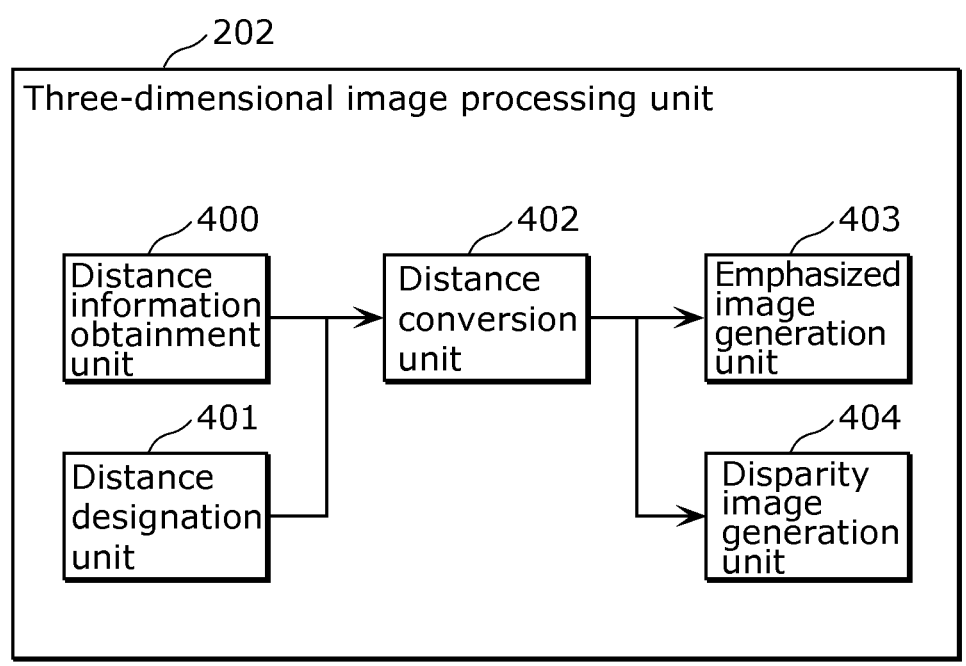
FIG. 2 is a block diagram showing a structure of a three-dimensional image processing unit in the embodiment of the present invention.

FIG. 2 is a block diagram showing a structure of the three-dimensional image processing unit 202 in the embodiment of the present invention. As shown in FIG. 2, the three-dimensional image processing unit 202 includes a distance information obtainment unit 400, a distance designation unit 401, a distance conversion unit 402, an emphasized image generation unit 403, and a disparity image generation unit 404.

The distance information obtainment unit 400 obtains, based on an image captured by the imaging unit 100, distance information indicating a distance of a scene from a camera (which distance is also referred to an actual distance hereinbelow).

The distance designation unit 401 receives input of a designated distance that is a target distance in which the stereoscopic effect is to be emphasized. In other words, the distance designation unit 401 designates a distance in which the stereoscopic effect is desired to be emphasized.

The distance conversion unit 402 converts a distance indicated in the distance information into a stereoscopic distance so that a stereoscopic effect of a scene in the designated distance is emphasized. Specifically, the distance conversion unit 402 converts an actual distance into a stereoscopic distance so that the change amount of the stereoscopic distance is greater than the change amount of the actual distance in the designated distance. It is to be noted that the stereoscopic distance is a distance for generating three-dimensional images (for example, disparity images).

In this embodiment, the distance conversion unit 402 converts an actual distance into a stereoscopic distance using a conversion expression for converting an actual distance into a stereoscopic distance in which the stereoscopic effect is emphasized more than in the actual distance in the designated distance. This conversion expression represents a stereoscopic distance as a function of an actual distance. Furthermore, in this conversion expression, the rate of change of the function (the stereoscopic distance) in the designated distance is greater than 1. This results in that, in the designated distance, the change amount of the stereoscopic distance will be greater than the change amount of the actual distance.

It is to be noted that the distance conversion unit 402 does not always need to perform the distance conversion using the conversion expression. The distance conversion unit 402 may convert an actual distance into a stereoscopic distance by referring to a table in which an actual distance and a stereoscopic distance are associated with each other, for example.

The emphasized image generation unit 403 processes a captured image based on the stereoscopic distance to generate an emphasized image which represents a stereoscopic effect to be emphasized in the designated distance. In other words, the emphasized image generation unit 403 processes a captured image based on the stereoscopic distance to generate an emphasized image in which the stereoscopic effect to be emphasized in the designated distance is visible. The image in which a stereoscopic effect is visible means an image which allows a user to perceive a stereoscopic effect.

In this embodiment, the emphasized image generation unit 403 adds blur to a captured image using information on a stereoscopic distance so as to show a region where a stereoscopic effect is emphasized or to show a degree of emphasis of a stereoscopic effect. Specifically, the emphasized image generation unit 403 generates an emphasized image by processing a captured image so that a region where the difference between the designated distance and the stereoscopic distance is greater has more blur. Conversely, the emphasized image generation unit 403 processes a captured image so that a region where the difference between the designated distance and the stereoscopic distance is less has less blur.

The disparity image generation unit 404 generates left-eye and right-eye images based on a stereoscopic distance. Specifically, the disparity image generation unit 404 generates, using the captured image, disparity images (for example, a left-eye image and a right-eye image) which have a disparity depending on the stereoscopic distance.

The disparity images generated as above are output to a stereoscopic display apparatus (not shown), for example. The stereoscopic display apparatus displays the disparity images using a glasses-type stereoscopic display system, for example. The glasses-type stereoscopic display system is a system in which left-eye and right-eye images having a disparity are displayed to a user wearing a pair of glasses (for example, liquid-crystal shutter glasses or polarized glasses).

It is to be noted that the stereoscopic display apparatus does not always need to display disparity images using the glasses-type stereoscopic display system and may display disparity images using a naked-eye-type stereoscopic display system. The naked-eye-type stereoscopic display system is a stereoscopic display system in which no glasses are used (for example, a parallax barrier system or a lenticular lens system).

Next, a processing operation of the three-dimensional image processing unit 202 configured as above is described.

Figure 3:
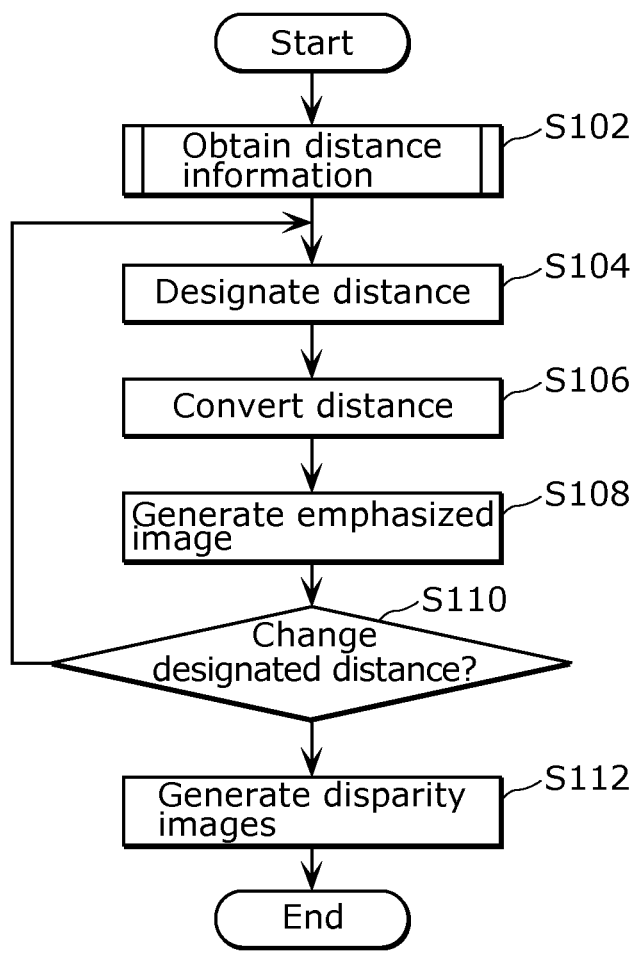
FIG. 3 is a flowchart showing a processing operation of the three-dimensional image processing unit in the embodiment of the present invention.

FIG. 3 is a flowchart showing a processing operation of the three-dimensional image processing unit 202 in the embodiment of the present invention.

First, the distance information obtainment unit 400 obtains, based on an image captured by the imaging unit 100, distance information indicating a distance of a scene from a camera (S102). Subsequently, the distance designation unit 401 receives input of a designated distance (S104). The distance conversion unit 402 converts a distance of the scene indicated in the distance information into a stereoscopic distance so that a stereoscopic effect of the scene in the designated distance is emphasized (S106). The emphasized image generation unit 403 processes the captured image based on the stereoscopic distance to generate an emphasized image which represents the stereoscopic effect to be emphasized in the designated distance (S108).

Here, in the case where the designated distance needs to be changed (Yes in S110), the processing returns to the process of Step S104. The case where the designated distance needs to be changed includes, for example, the case where an instruction to change the designated distance is given by a user who visually checks the emphasized image displayed by the display unit 300. On the other hand, in the case where the designated distance does not need to change (No in S110), the disparity image generation unit 404 generates multi-view images which have a disparity depending on the stereoscopic distance (S112).

Next, details of the process in each step shown in FIG. 3 are described.

<Distance Information Obtainment Process (S102)>

First, details of the distance information obtainment process in Step S102 are described.

The distance information obtainment unit 400 obtains distance information of the scene from the image signal obtained by the imaging unit 100. Although this embodiment illustrates a method of measuring a distance using a depth from defocus method disclosed by Patent Literature (PTL) 6, other methods may be used (such as a stereo method using a plurality of cameras, photometric stereo, or a TOF method using an active sensor, for example).

In the depth from defocus method, the imaging unit 100 first captures a plurality of images different in blur with the lens or aperture with different settings. The distance information obtainment unit 400 then calculates, for each pixel, a degree of blur correlation among the images captured as above. By referring to a reference table which defines a relationship between a degree of this blur correlation and an object distance, the distance information obtainment unit 400 obtains distance information.

Figure 4:
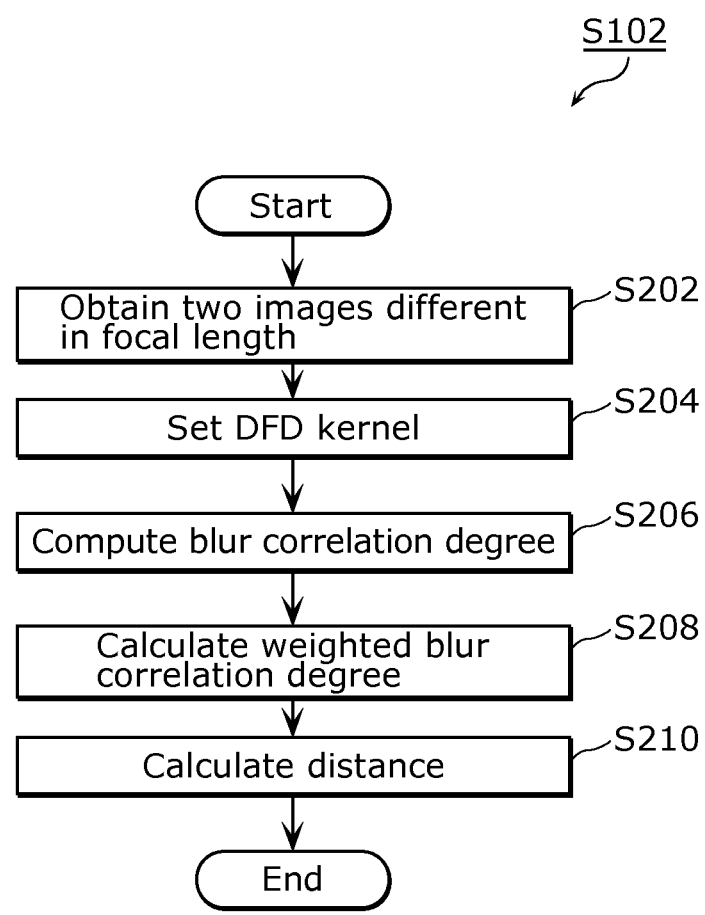
FIG. 4 is a flowchart showing a processing operation of a distance information obtainment unit in the embodiment of the present invention.

FIG. 4 is a flowchart showing an example of a processing operation of the distance information obtainment unit 400 in the embodiment of the present invention. Specifically, FIG. 4 shows how to measure a distance according to the depth from defocus method.

First, the distance information obtainment unit 400 obtains, from the imaging unit 100, two images which are images of the same scene captured with different focal lengths (S202). The focal length can be changed by shifting the position of the lens or the imaging device.

Next, the distance information obtainment unit 400 sets, as DFD kernel, a region including a target pixel subject to the distance measurement and a group of pixels located in the proximity of the target pixel (S204). This DFD kernel becomes subject to the distance measurement. The size and shape of the DFD kernel are not particularly limited and, for example, a rectangular region of 10 by 10 pixels around the target pixel may be set as the DFD kernel.

The distance information obtainment unit 400 then extracts the region set as the DFD kernel from the two images captured with different focal lengths, and calculates a degree of per-pixel blur correlation for each pixel of the DFD kernel (S206).

Here, using a weight coefficient predetermined for the DFD kernel, the distance information obtainment unit 400 weights the blur correlation degree calculated for each pixel of the DFD kernel (S208). This weight coefficient is a coefficient which has a greater value for a pixel closer to the center of the DFD kernel and has a smaller value for a pixel closer to an edge of the DFD kernel, for example. It is to be noted that the existing distribution of weights such as the Gaussian distribution may be used as the weight coefficient. There is a feature in this weighting process that provides robustness against the influence of noise. A sum of weighted blur correlation degrees is handled as the blur correlation degree of the DFD kernel.

Lastly, the distance information obtainment unit 400 calculates distance information from the blur correlation degree by using a lookup table which indicates a relationship between distance information and a blur correlation degree (S210). In the lookup table, the blur correlation degree has a linear relationship to the inverse of the object distance (see Non Patent Literature (NPL) 5 as to the lookup table calculation process). If the blur correlation degree is not included in the lookup table, the distance information obtainment unit 400 only needs to determine an object distance by interpolation. In addition, it is preferable to change the lookup table when the optical system changes. Thus, the distance information obtainment unit 400 may have previously prepared a plurality of lookup tables for different sizes of the aperture, different focal lengths, or the like. Since the setting information on optical systems is known at the time of imaging, a lookup table to be used can be determined in advance.

Next, a method of calculating a blur correlation degree is described.

Two images captured with focal lengths different from each other are denoted by images G1 and G2. The distance information obtainment unit 400 selects a target pixel subject to the measurement of an object distance, and sets, as the DFD kernel, pixel values in a rectangular region of M by M pixels in the proximity of the target pixel, for each of the images G1 and G2. Pixel values inside the DFD kernel in the respective images G1 and G2 are denoted by g1(u, v) and g2(u, v) where {u, v: 1, 2, 3, ... M}, and the coordinates of the target pixel are (cu, cv). A degree of per-pixel blur correlation G(u, v) at a given pixel position (u, v) inside the DFD kernel is represented by (Expression 3).

[MATH. 3]

$$G(u, v) = \frac{C\{g1(u, v) - g2(u, v)\}}{\Delta g1(u, v) + \Delta g2(u, v)}$$ (Expression 3)

Here, C is a constant and is determined experimentally. Δ represents a quadratic differential (Laplacian) of a pixel value. As above, the degree of per-pixel blur correlation is calculated by dividing a difference in pixel value at a predetermined pixel between two images different in blur by a mean value of quadratic differentials of the two images at the predetermined pixel. This blur correlation degree represents a level of correlation of blur for each pixel included in the images.

Through the above processes, it is possible to obtain distance information on a captured scene. It is to be noted that the distance information obtainment unit 400 does not always need to perform the above processes. It may also be possible that the distance information obtainment unit 400 simply obtains the distance information generated by the imaging unit 100.

<Distance Designation Process (S104)>

Figure 5A:
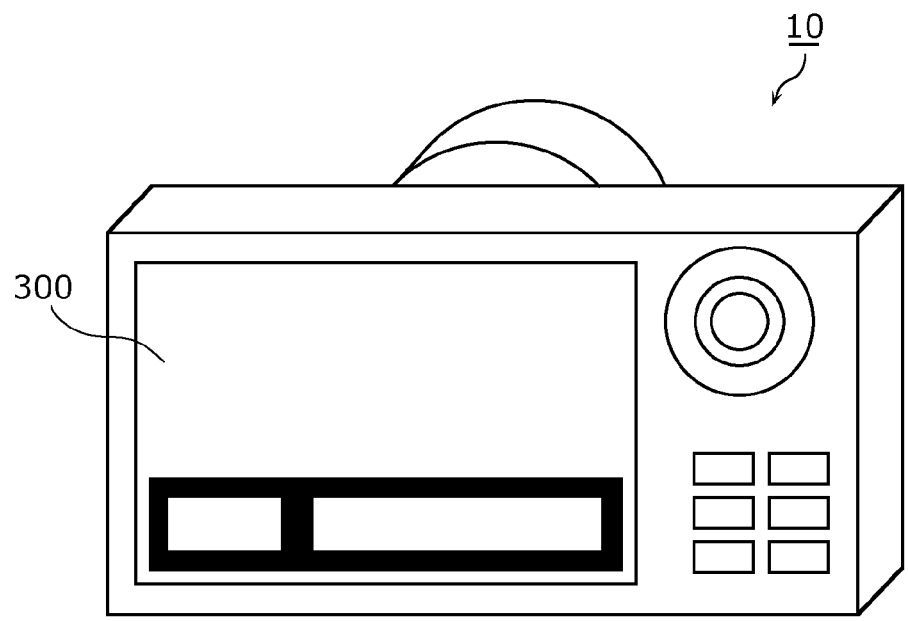
FIG. 5A shows an example of a distance designation method which is used in a distance designation unit in the embodiment of the present invention.

Next, in Step S104, the distance designation unit 401 receives, from a user, input of a designated distance that is a distance of an object whose stereoscopic effect is desired to be emphasized. It is sufficient that, using a slide bar as shown in FIG. 5A, for example, the user designates a distance in which the stereoscopic effect is desired to be emphasized.

Figure 5B:
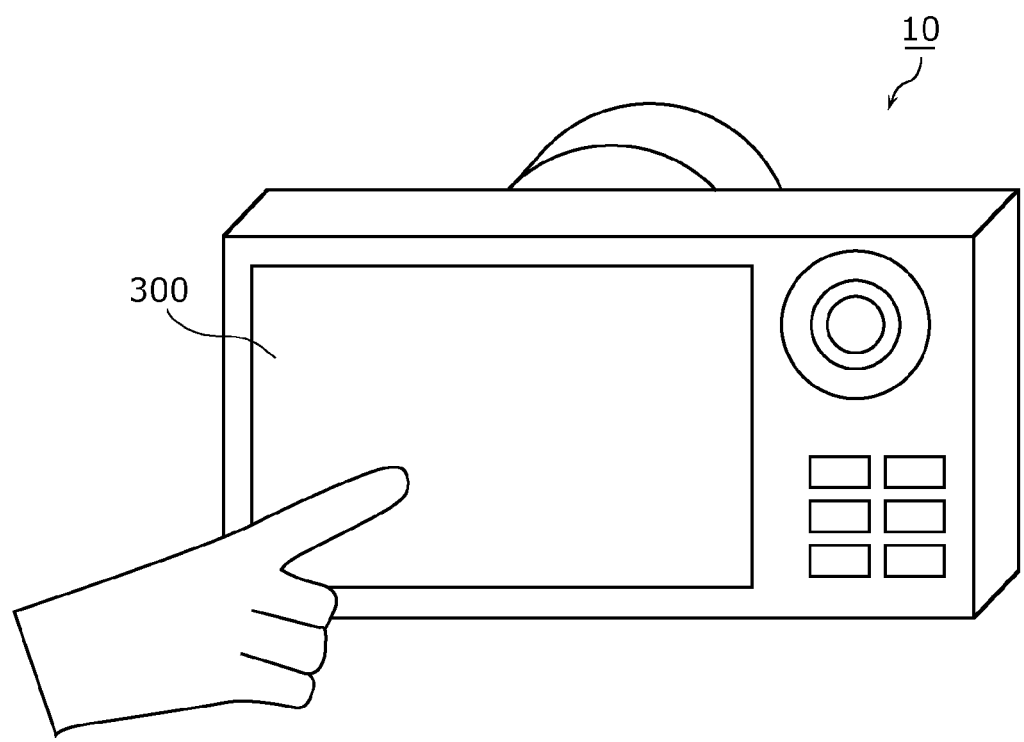
FIG. 5B shows the example of the distance designation method which is used in the distance designation unit in the embodiment of the present invention.

Furthermore, a user may designate, in the image displayed on the display unit 300, an object whose stereoscopic effect is desired to be emphasized, thereby designating the distance of the object as the distance in which the stereoscopic effect is desired to be emphasized. In this case, the display unit 300 preferably has a function of a touch panel. With this, a user can easily designate an object by only touching the display unit 300 as shown in FIG. 5B.

<Distance Conversion Process (S106)>

Next, details of the distance conversion process in Step S106 are described.

The distance conversion unit 402 converts an actual distance into a stereoscopic distance in which the stereoscopic effect is emphasized more than in the actual distance. In this embodiment, a plurality of conversion expressions each for converting an actual distance into a stereoscopic distance has been prepared in advance. The distance conversion unit 402 selects, from among the conversion expressions, a conversion expression suited to emphasizing the stereoscopic effect in the designated distance, and converts the actual distance into the stereoscopic distance using the selected conversion expression.

The following describes a method of determining, for each distance, a conversion expression suited to emphasizing the stereoscopic effect. In this embodiment, a plurality of conversion expressions which are obtained based on the principle of the toed-in camera configuration (the congestion stereo method) disclosed by Non Patent Literature (NPL) 6 has been held in advance.

Figure 6:
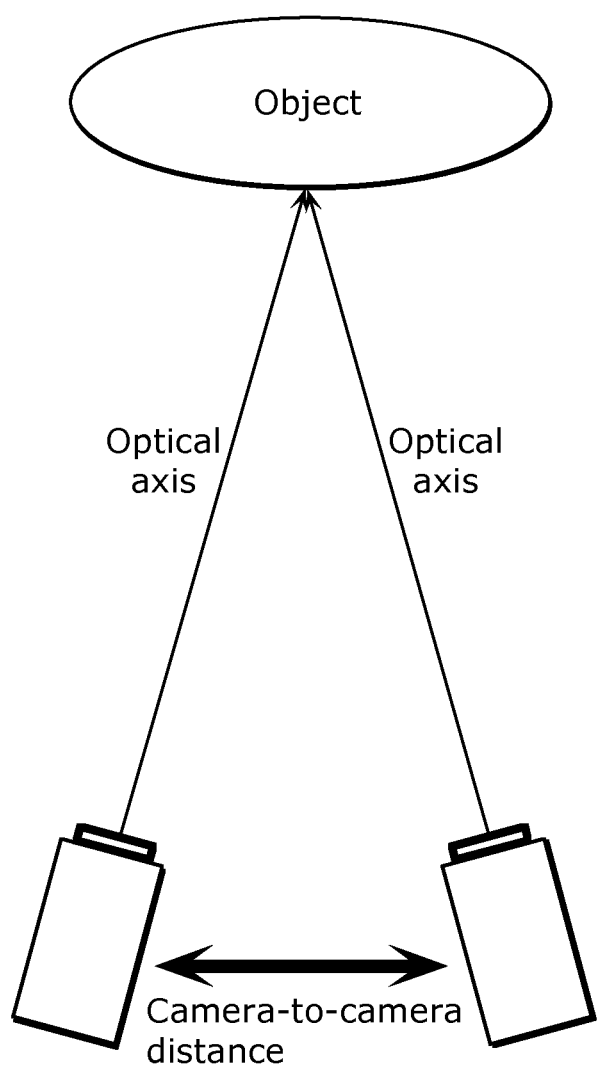
FIG. 6 shows an example of convergence stereo in the embodiment of the present invention.

In the congestion stereo method, two cameras are placed as shown in FIG. 6 in a manner that optical axes of these cameras intersect with each other, and it is possible to change the stereoscopic distance of the object by moving back and fourth a position at which the optical axes intersect with each other. In the congestion stereo method, changing the distance between the cameras allows to change, forward or backward, the position at which the optical axes intersect with each other, thereby allowing a depth amount of an object to be controlled. Consequently, the congestion stereo method is known for easiness of stereoscopic effect production.

The development of a formula disclosed by NPL 6 leads to (Expression 4).

[MATH. 4]

$$Ld = \frac{1}{\frac{1}{Ls} - \frac{a1a2}{Lc} + \frac{a1a2}{Lb}}$$ (Expression 4)

The use of (Expression 4) determines a relationship between an actual distance Lb calculated using the depth from defocus method and a stereoscopic distance Ld in which a stereoscopic image appears. Here, Ls denotes a visual range and is an actual distance to an object which is in focus at the time of shooting. Lc denotes a distance to a point at which the optical axes of the cameras intersect with each other at the time of shooting. a1 denotes a ratio between (i) a distance between the cameras at the time of shooting and (ii) a distance between the left and right disparity images. a2 denotes a ratio between an angle of view of an image at the time of shooting and an angle of view of the disparity images.

Figures 7A, 7B:
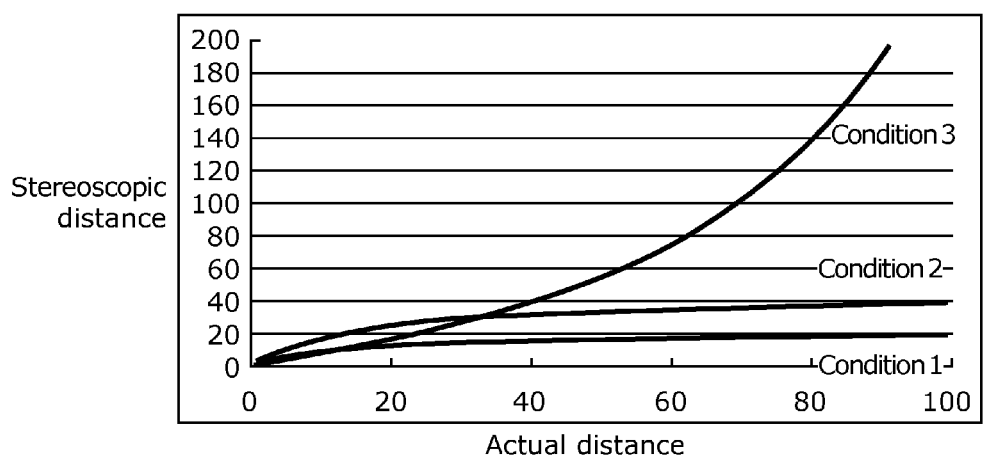
FIG. 7A shows an example of parameters in a conversion expression in the embodiment of the present invention.
FIG. 7B shows an example of a relationship between an actual distance and a stereoscopic distance in the embodiment of the present invention.

FIG. 7A shows an example of parameters in the conversion expression in the embodiment of the present invention. In FIG. 7A, dc denotes a distance between cameras, de denotes a distance between eyes (an interocular distance) at the time of viewing, a denotes a distance between imaging lenses, and β denotes a distance between display screens. Thus, the relationship with (Expression 4) gives a1=dc/de and a2=tan(β/2)/tan(α/2).

For example, when the parameters are set as shown in FIG. 7A, the relationship between an actual distance and a stereoscopic distance will be that as shown in FIG. 7B. FIG. 7B shows results of distance conversion obtained under conditions 1, 2, and 3. In FIG. 7B, the horizontal axis represents an actual distance, and the vertical axis represents a stereoscopic distance. The condition indicates a combination of values of parameters (such as Ls and Lc).

FIG. 7B shows that the stereoscopic distance changes nonlinearly with respect to the change in the actual distance. For example, for each of the conditions 1 and 2, the change amount in the stereoscopic distance is greater than the change amount in the actual distance when the actual distance is less than or equal to 40. For the condition 3, the change amount in the stereoscopic distance is greater than the change amount in the actual distance when the actual distance is greater than 40. The stereoscopic effect is more visible as the change amount in the stereoscopic distance increases with respect to the change amount in the actual distance.

As a result of the foregoing, the conversion expression for emphasizing the stereoscopic effect in the designated distance needs to make, in the designated distance, a change amount in the stereoscopic distance greater than a change amount in the actual distance. Thus, the distance conversion unit 402 selects, from among conversion expressions, a conversion expression which gives, in the designated distance, the largest change amount in the stereoscopic distance. Using the conversion expression thus selected, the distance conversion unit 402 converts an actual distance of a scene into a stereoscopic distance, and is thereby capable of obtaining the stereoscopic distance for emphasizing the stereoscopic effect in the designated distance.

Here, how to obtain the conversion expression is specifically described. First, the following describes how to select, when there is one designated distance, a conversion expression for emphasizing the stereoscopic effect of a scene in the designated distance, from among conversion expressions.

First, a plurality of conversion expressions corresponding to a plurality of conditions has been generated in advance. The n-th conversion expression for an actual distance d is denoted by f(d, n). In more detail, f(d, n) denotes the stereoscopic distance corresponding to the actual distance d and determined by the n-th conversion expression.

It is sufficient that the condition (parameters) for generating a conversion expression is determined based on existing knowledge. The conversion expression can be generated before capturing an image and may also be generated at the design stage. Here, assume that N conversion expressions have been generated in advance.

Furthermore, assume that the range of an actual distance is 0 to dmax. Depending on a scene used, the range of an actual distance has a different unit of length such as centimeter or meter; the unit representation is omitted in this embodiment. A table in which the number n of the conversion expression for the actual distance d is held is denoted by T. Here, the change amount of the stereoscopic distance when the actual distance changes by 1 is represented as Δf(d, n)=f(d+1, n)−f(d, n).

As already described, when the change amount Δf(d, n) of the stereoscopic distance is great with respect to the change amount of the actual distance d, the stereoscopic effect of the object located in the actual distance d can be emphasized. Thus, the distance conversion unit 402 specifies, as shown in (Expression 5), a conversion expression by which the change amount Δf(d, n) of the stereoscopic distance is largest among the N conversion expressions, and records the specified conversion expression in association with the actual distance d.

Here, how to create the table T is described in detail. First, as shown in (Expression 5), the change amount Δf(d, n) of the stereoscopic distance for each actual distance d is calculated for all the conversion expressions, and a conversion expression by which Δf(d, n) is largest is specified. The conversion expression thus specified is stored into the table T[d] in association with the actual distance d. As a result, simply by referring to the table T, the distance conversion unit 402 is capable of selecting, from among the conversion expressions, a conversion expression for emphasizing the stereoscopic effect of the scene in the designated distance α. In this embodiment, the number n of the conversion expression to be used for each distance is stored into the table T to reduce the processing load for selecting a conversion expression.

[MATH. 5]

$$\text{for}(d = 0; d < d\max; d++)$$
$$\{$$
$$\quad T[d] = \underset{n}{\operatorname{argmax}}(\Delta f(dn))$$
$$\}$$

(Expression 5)

Through the above operation, the distance conversion unit 402 is capable of converting the actual distances 0 to dmax into the stereoscopic distances f(T[α], 0) to f(T[α], dmax) when the designated distance α is input.

Figure 8:
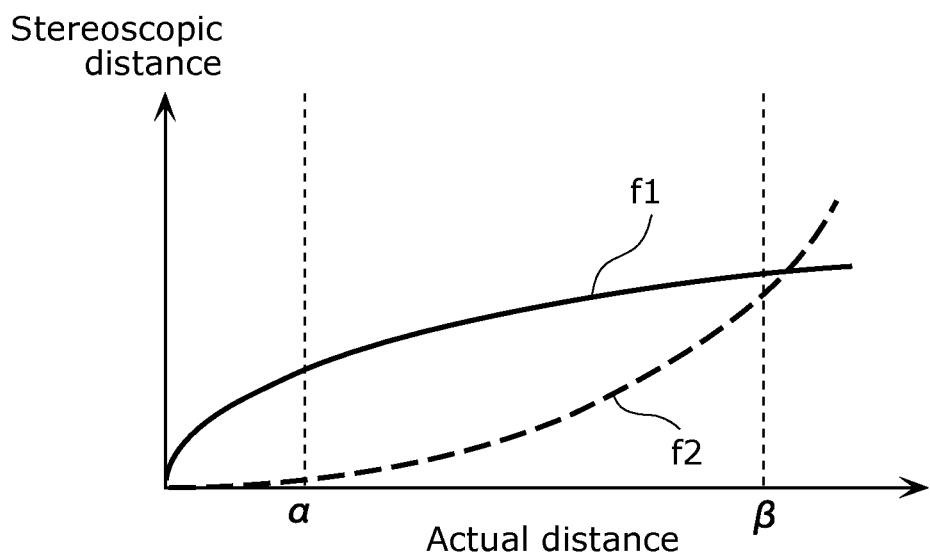
FIG. 8 shows an example of a method of setting a conversion expression in the case where a plurality of designated distances is designated.
Figure 8:
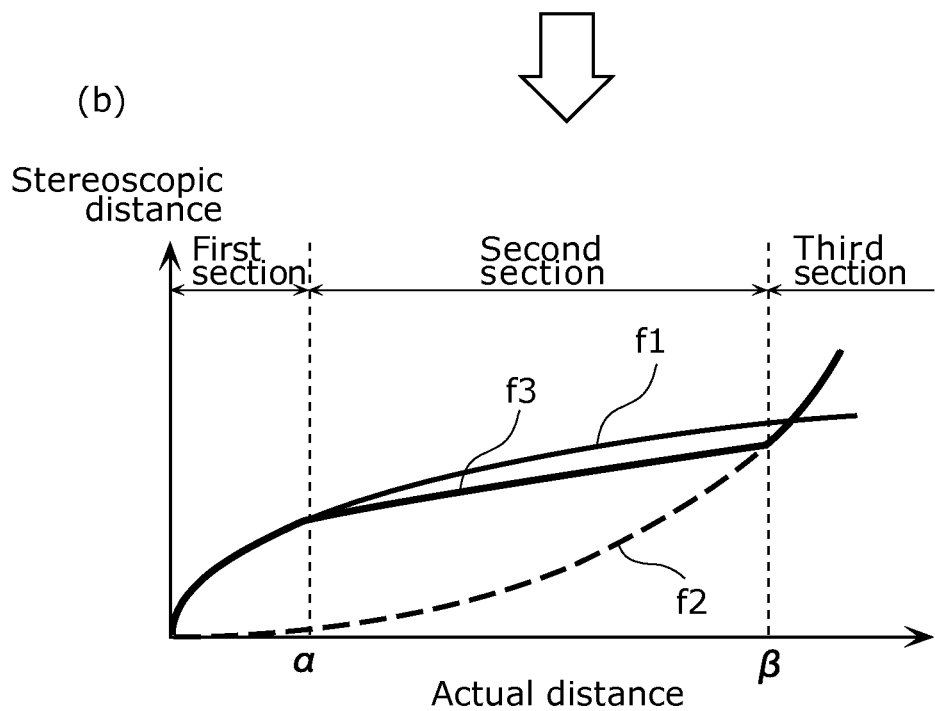

Next, the following describes how to obtain, when there are two or more designated distances, a conversion expression for emphasizing the stereoscopic effect of a scene in the two or more designated distances. For example, assume that, as shown in FIG. 8, there are two conversion expressions f1 and f2, and the actual distances in which the stereoscopic effect of the scene is desired to be emphasized are designated distances α and β.

In such a case, the actual distance is divided into three sections before conversion of actual distances into stereoscopic distances. The three sections include a first section where the actual distance is 0 to α, a second section where the actual distance is α to β, and a third section where the actual distance is β and subsequent distances thereof, as shown in (b) of FIG. 8. In the first section where the actual distance is 0 to α, the actual distance is converted using the conversion expression f1. In the second section where the actual distance is α to β, the actual distance is converted using a new conversion expression f3 obtained by combining the conversion expression f1 and the conversion expression f2. In the third section where the actual distance is β and subsequent distances thereof, the actual distance is converted using the conversion expression f2.

The conversion expression f3 has properties as follows. When the stereoscopic distance obtained for the actual distance α using the conversion expression f1 is f1(α) and the stereoscopic distance obtained for the actual distance β using the conversion expression f2 is f2(β), then f1(α)<f2(β) where α<β. When this condition is not met, the stereoscopic distance and the actual distance are opposite, resulting in an appearance which gives a feeling of strangeness.

Thus, the conversion expression f3 is defined by a line (which may be straight or curved) connecting coordinates (α, f1(α)) and coordinates (β, f2(β)) and is defined by a line which increases in a monotonous manner with respect to the actual distance. For example, in the case where the conversion expression f3 is defined by a straight line when f1(α)≤f2(β), the conversion expression f3 has a slope of "(f1(α)−f2(β))/(α−β)" and an intercept of "α((f1(α)−f2(β))/(α−β))−f1(α)".

When f1(α)>f2(β), the line connecting the coordinates (α, f1(α)) and the coordinates (β, f2(β)) represents a monotonous decrease. Therefore, to the conversion expression f2, a constant T of f1(α) or more is added as an offset to transform the expression in a way that will not decrease the stereoscopic distance along with an increase in the actual distance. As a result, a conversion expression f2' defined as f2'(d)=(f2(d)+T)≥f1(α) is used in the third section where the actual distance is β and subsequent distances thereof.

Through the foregoing, the conversion expressions in the first to third sections can be defined.

When there are three designated distances, assume that there is a new designated distance γ between α and β, and the conversion expressions in the section from α to γ and the section from γ to β are defined in the same manner as generating the conversion expression f3 which is described in the above example. By thus subdividing the section between α and β, it is possible to easily define conversion expressions even when there are three or more designated distances.

As above, the distance conversion unit 402 selects, from among the conversion expressions held in advance, a conversion expression which gives the largest change amount in the designated distance, and converts an actual distance into a stereoscopic distance using the selected conversion expression.

<Emphasized Image Generation Process (S108)>

Next, details of the emphasized image generation process in Step S108 are described.

The emphasized image generation unit 403 uses a stereoscopic distance to generate, as an emphasized image, a two-dimensional image in which a degree of emphasis of a stereoscopic effect can be visually recognized even by a two-dimensional display apparatus which displays a two-dimensional image. In this embodiment, the emphasized image generation unit 403 adds blur to a captured image to generate an emphasized image which represents a stereoscopic effect to be emphasized.

It is to be noted that the emphasized image generation unit 403 does not always need to add blur to generate an emphasized image. For example, the emphasized image generation unit 403 may add shading or the like to represent a stereoscopic effect in a two-dimensional image. In addition, the emphasized image generation unit 403 may use perspective or atmospheric perspective (that is a method of producing a perspective effect by drawing a far object in blue with low contrast) to represent a stereoscopic effect.

Here, more details of the process of generating an emphasized image by adding blur are described.

First, the emphasized image generation unit 403 generates a restored image by performing a restoration process on a captured image. If blur which is created at the time of shooting exists in the image to which blur is to be added, blur which is newly added and blur which is created at the time of shooting are present in mixture, with the result that the stereoscopic effect will not be represented well.

Thus, in this embodiment, the stereoscopic image generation unit 403 uses information on a stereoscopic distance and a lens formula to calculate blur information (blur kernel) indicating a size of blur at each pixel. The emphasized image generation unit 403 then performs an inverse convolution operation (a restoration process) on each pixel of the captured image using the blur kernel, to generate, as a restored image, an image with all the pixels in focus (an all-in-focus image).

The emphasized image generation unit 403 then adds, to the all-in-focus image thus generated, blur which produces a stereoscopic effect, thereby generating an emphasized image.

In order to explain the above processing, a process of generating blur in an image is described first. The luminance distribution of an all-in-focus image with no blur is denoted by s(x, y) and a blur function (which is a point spread function abbreviated as PSF) indicating a size of blur is denoted by f(x, y). Here, in order to simplify the description, suppose that the entire image has blur represented by the uniform blur function f. With the influence of noise neglected, the following (Expression 6) is satisfied.

[MATH. 6]

$$i(x,y)=s(x,y)*f(x,y) \quad \text{(Expression 6)}$$

Figure 9:
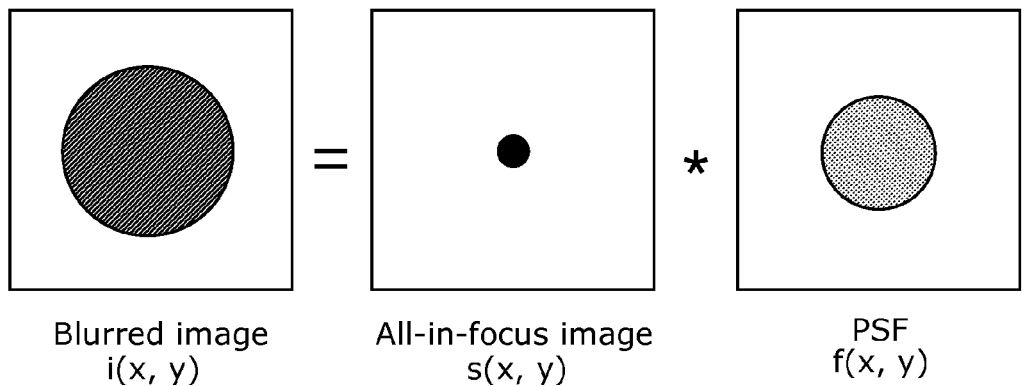
FIG. 9 shows a relationship among a blurred image, an all-in-focus image, and PSF.

Here, the sign "*" indicates a convolution operation. FIG. 9 shows an example of image representation of (Expression 6). When the all-in-focus image is given using a dot as shown in FIG. 9, the blur image s(x, y) is obtained through convolution with a circular blur function (its details are defined hereinafter). This bluff function is also referred to as a blur kernel. Here, the diameter of a circle of the blur function is called a kernel size.

The right side of (Expression 6) is generally represented as the following (Expression 7).

[MATH. 7]

$$s(x, y) * f(x, y) = \int_{-\infty}^{\infty}\int_{-\infty}^{\infty} s(j, k)f(x - j, y - k)\,dj\,dk \quad \text{(Expression 7)}$$

When the image is made up of M by N pixels, the above (Expression 7) can be represented as the following (Expression 8).

[MATH. 8]

$$s(x, y) * f(x, y) = \frac{1}{M \times N} \sum_{j=0}^{M-1} \sum_{k=0}^{N-1} s(j, k) f(x-j, y-k)$$ (Expression 8)

Generally, the Fourier transform of a convolution of two functions is represented as a product of Fourier transforms of the respective functions. Therefore, (Expression 6) leads to the following (Expression 9) when the Fourier transforms of i(x, y), s(x, y), and f(x, y) are represented as I(u, v), S(u, v), and F(u, v). It is to be noted that (u, v) is coordinates in the frequency domain and corresponds to spatial frequencies in the x direction and in the y direction in an actual image.

[MATH. 9]

$$I(u,v) = S(u,v) \cdot F(u,v)$$ (Expression 9)

Here, the sign "·" indicates the "product" of the functions in the frequency domain. Transforming (Expression 9) leads to the following (Expression 10).

[MATH. 10]

$$S(u, v) = \frac{I(u, v)}{F(u, v)}$$ (Expression 10)

This (Expression 10) indicates that the function obtained by subtracting the Fourier transform I(u, v) of the image i(x, y) captured with a camera by the Fourier transform F(u, v) of f(x, y) that is a blur function PSF corresponds to the Fourier transform S(u, v) of the all-in-focus image s(x, y).

Accordingly, once f(x, y) that is a blur function PSF of each pixel is found, the all-in-focus image s(x, y) can be determined from the captured image i(x, y).

Figure 10:
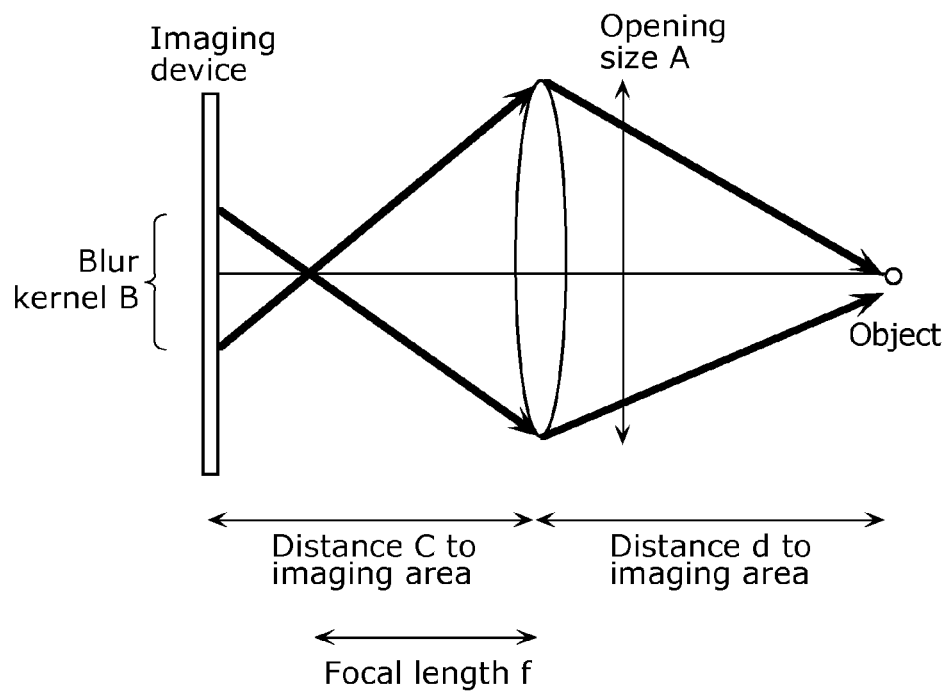
FIG. 10 shows how to determine a size of a blur kernel in the embodiment of the present invention.

Thus, an example of determining a blur function PSF of each pixel is described. FIG. 10 shows a schematic diagram of a lens. The size of blur kernel created at the time of shooting an object with a camera located at a distance d is denoted by B, and the distance from an opening area to an imaging area is denoted by C. From setting conditions of the camera, a diameter of an aperture (an opening size) A and a focal length f are known. Here, the relationship between the opening size A and the focal length f and the relationship between a blur kernel B and a difference between the distance C from the opening area to the imaging area and the focal length f are similar to each other, which leads to (Expression 11).

[MATH. 11]

$$A:B = f:C-f$$ (Expression 11)

From (Expression 11), the size B of blur kernel is represented by (Expression 12).

[MATH. 12]

$$B = \frac{(C-f)A}{f}$$ (Expression 12)

Here, the lens formula leads to (Expression 13).

[MATH. 13]

$$\frac{1}{C} + \frac{1}{d} = \frac{1}{f}$$ (Expression 13)

Since the distance d from the camera to the object and the focal length f are known, (Expression 12) can be transformed into (Expression 14) using (Expression 13).

[MATH. 14]

$$B = \frac{\left(\frac{1}{\left(\frac{1}{d} + \frac{1}{f}\right)} - f\right) A}{f}$$ (Expression 14)

The emphasized image generation unit 403 is capable of determining the size B of blur kernel by (Expression 14). Once the size B of blur kernel is determined, the blur function f(x, y) can be obtained. In this embodiment, the blur kernel is defined using a pillbox function. The pill box function can be defined by (Expression 15).

[MATH. 15]

$$f(x, y) = \begin{cases} 1 : \text{if } \sqrt{x^2 + y^2} \leq \frac{B}{2} \\ 0 : \text{otherwise} \end{cases}$$ (Expression 15)

Using the above method, the emphasized image generation unit 403 determines a blur kernel of each pixel and thereby obtains a blur function. The emphasized image generation unit 403 then generates an all-in-focus image by performing an inverse convolution operation on the captured image by (Expression 10) using the blur function. In other words, the emphasized image generation unit 403 generates a restored image by performing a restoration process on the captured image using blur information indicating features of blur in the captured image.

Next, the emphasized image generation unit 403 adds blur to the all-in-focus image to generate an emphasized image in which a stereoscopic effect to be emphasized in a designated distance (a position at which the stereoscopic effect is emphasized or a degree of emphasis of the stereoscopic effect) can be visually recognized even by a two-dimensional display apparatus. In this embodiment, the emphasized image generation unit 403 generates an emphasized image by processing the all-in-focus image so that the image is in focus in the designated distance and has a larger blur amount at a position farther from the designated distance. In other words, the emphasized image generation unit 403 generates an emphasized image by adding more blur to a region where the difference between the designated distance and the stereoscopic distance is greater.

Furthermore, in order to add blur to the all-in-focus image, the pillbox function defined by (Expression 15) is used in this embodiment. The emphasized image generation unit 403 increases the amount of blur in an image region in a stereoscopic distance as the difference between the designated distance and the stereoscopic distance increases.

A conceivable method for increasing the amount of blur is to increase the kernel size of the pillbox function (i.e., to increase a size of 3 by 3 to a size of 5 by 5) at a position 10 away in the stereoscopic distance, for example. Thus, the emphasized image generation unit 403 determines, at each of the pixels of the all-in-focus image, a size of blur kernel according to a level of the difference between the stereoscopic distance and the designated distance in the pixel. The emphasized image generation unit 403 then adds blur to each of the pixels of the all-in-focus image according to the determined size of blur kernel.

Through the above processing, the emphasized image generation unit 403 can generate an emphasized image which is focused in the designated distance and has blur which increases as the stereoscopic distance becomes more different from the designated distance.

Figure 11:
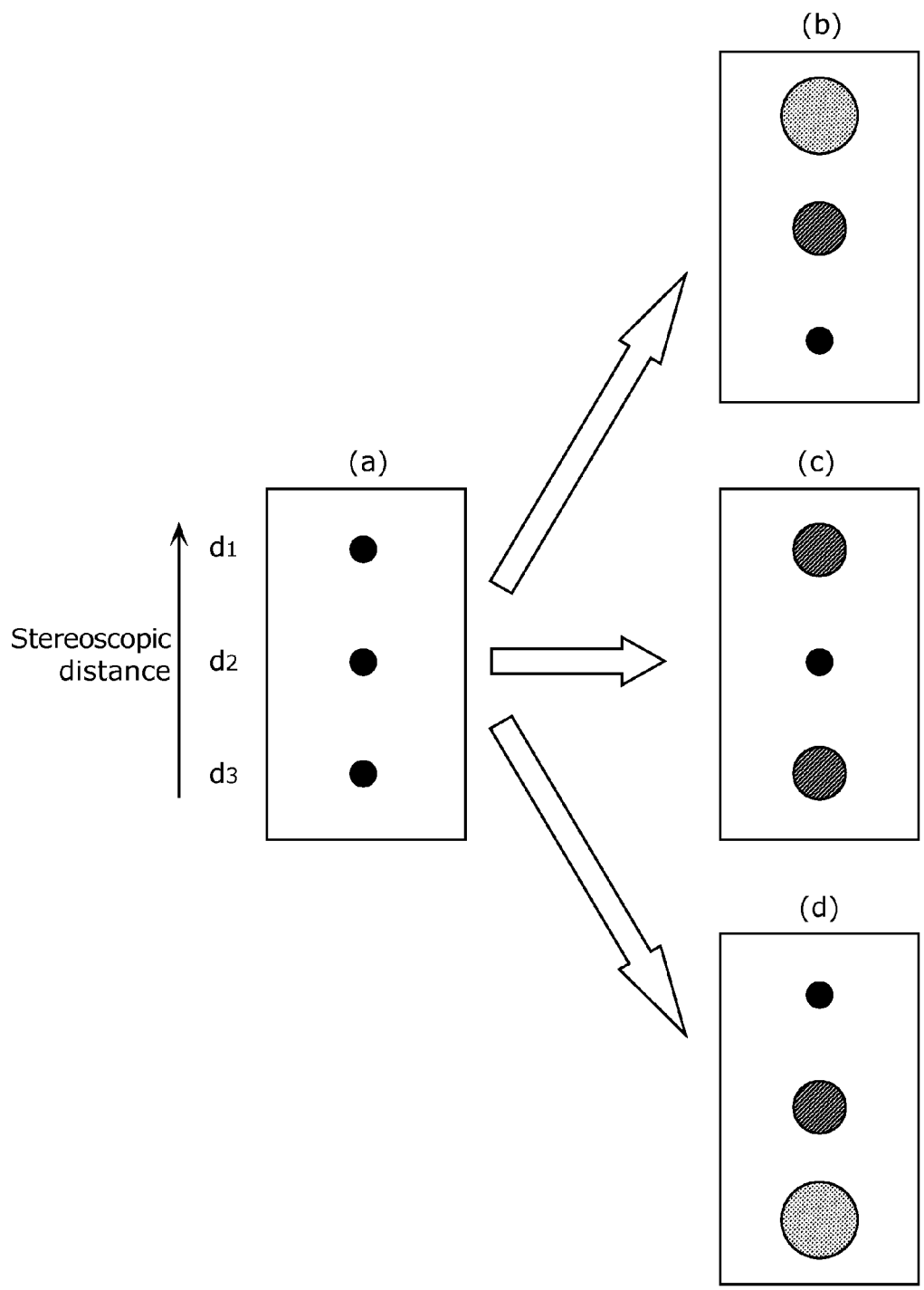
FIG. 11 is a conceptual illustration for explaining an emphasized image which is generated by the emphasized image generation unit in the embodiment of the present invention.

FIG. 11 is a conceptual illustration for explaining an emphasized image which is generated by the emphasized image generation unit 403 in the embodiment of the present invention. Images shown in (a) to (d) of FIG. 11 include objects having stereoscopic distances d1, d2, and d3. Here, the stereoscopic distances d1, d2, and d3 satisfy the relationship d1<d2<d3. Furthermore, the stereoscopic distances d1, d2, and d3 also satisfy the relationship d2−d1=d3−d2.

FIG. 11 shows an all-in-focus image in (a). In the all-in-focus image, the objects in the stereoscopic distances d1, d2, and d3 are in focus.

FIG. 11 shows, in (b), an emphasized image obtained when the designated distance α is equal to d1. As shown in (b) of FIG. 11, blur added to the object having the stereoscopic distance d3 is larger than blur added to the object having the stereoscopic distance d2 when the designated distance α=d1.

FIG. 11 shows, in (c), an emphasized image obtained when the designated distance α is equal to d2. As shown in (c) of FIG. 11, blur has been added to the objects having the stereoscopic distances d1 and d3 when the designated distance α=d2. Here, since the difference between the stereoscopic distances d1 and d2 is equal to the distance between the stereoscopic distances d3 and d2, blur of the same size has bee added to the objects having the stereoscopic distances d1 and d3.

FIG. 11 shows, in (d), an emphasized image obtained when the designated distance α is equal to d3. As shown in (d) of FIG. 11, blur added to the object having the stereoscopic distance d3 is larger than blur added to the object having the stereoscopic distance d2 when the designated distance α=d3.

Specifically, the emphasized image generation unit 403 generates an emphasized image by processing a captured image so that a region where the difference between the designated distance and the stereoscopic distance is greater has more blur. The emphasized image generation unit 403 then outputs the generated emphasized image to the display unit 300 which is a two-dimensional display apparatus. With the display unit 300 displaying the emphasized image, a user then can qualitatively check, at the time of shooting, in which region the stereoscopic effect is emphasized.

<Disparity Image Generation Process (S112)>

Lastly, the disparity image generation unit 404 generates disparity images (which indicate two pictures herein, a left-eye image and a right-eye image) using the stereoscopic distance and the all-in-focus image. Hereinbelow, the all-in-focus image is called texture (or a texture image), and an image which represents a value of the stereoscopic distance as a pixel value is called a distance image.

Figure 12:
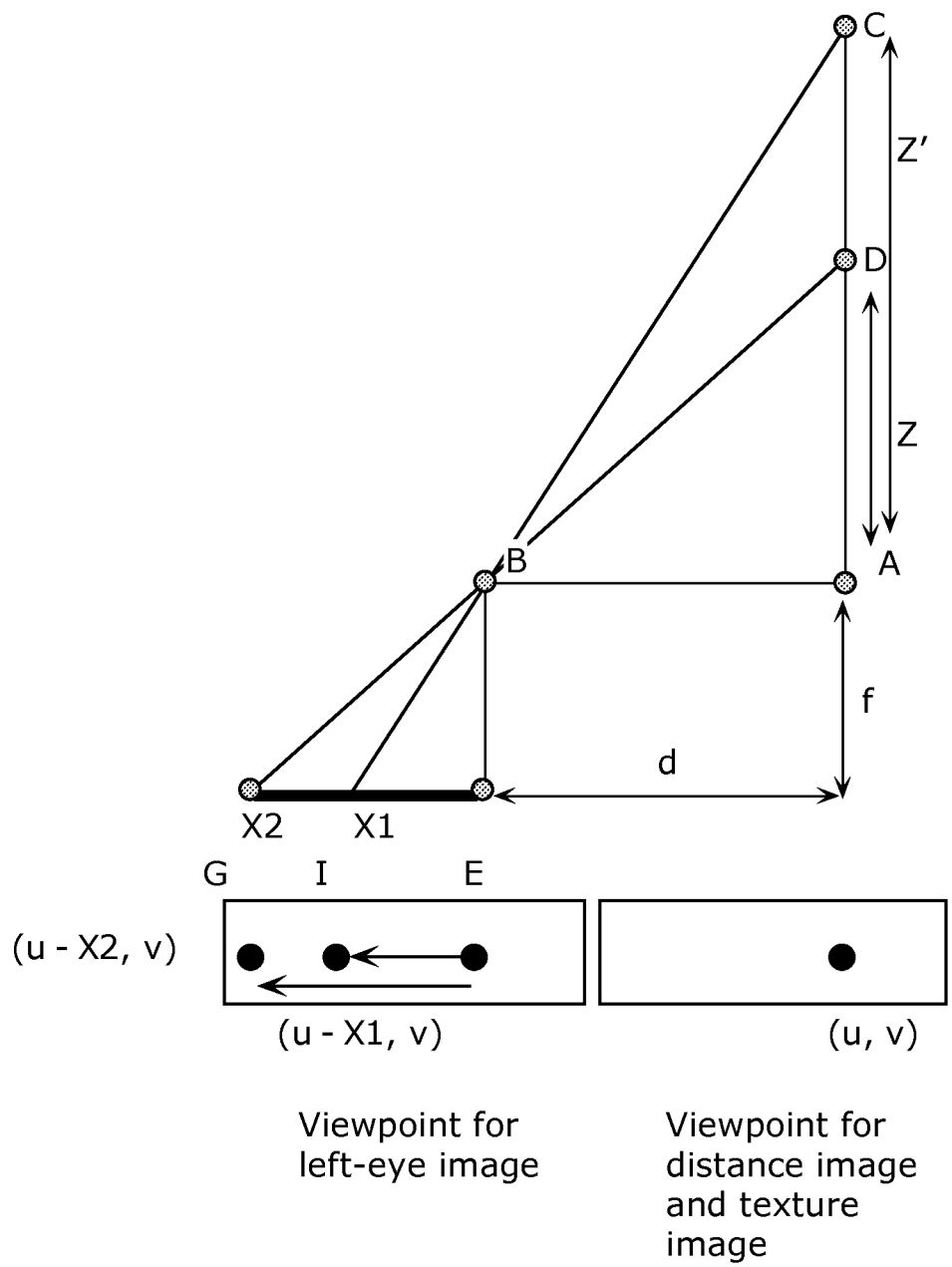
FIG. 12 is an illustration for explaining a disparity image generation method in the embodiment of the present invention.

How to generate a left-eye image based on the texture image and the distance image is described. FIG. 12 shows a relationship between (i) the distance image and the texture image and (ii) the left-eye image and the distance from the object. The signs in FIG. 12 have the following meaning.

A: Distance measurement position
B: Left disparity position
C, D: Objects
E: Optical axis at left disparity position
G, I: Shooting positions of objects C, D with left-eye camera
f: Focal length at distance measurement position
d: Distance between A and B
Z, Z': Distances to C and D
X1, X2: Coordinates on captured image If a pixel corresponding to a pixel (u, v) in the texture image is known in the left-eye image, it is possible to generate a left-eye image by copying the pixel value of the pixel (u, v) in the texture image into the corresponding pixel in the left-eye image. In FIG. 12, the focal length f and the distances Z and Z' from the camera to the objects are known. Furthermore, the distance d is known because it can be set to any value in advance when disparity images are generated. Here, a triangle ABC and a triangle EIB are similar, and a triangle ABD and a triangle EGB are similar, which leads to (Expression 16).

[MATH. 16]

$$f:Z'=X2:d, f:Z=X1:d \quad \text{(Expression 16)}$$

Transforming (Expression 16) leads to (Expression 17).

[MATH. 17]

$$X2 = \frac{fd}{Z'}, X1 = \frac{fd}{Z} \quad \text{(Expression 17)}$$

As a result of this, when the stereoscopic distance is Z, the pixel (u, v) in the texture image corresponds to a pixel (u−X1, v) in the left-eye image. Thus, it is sufficient that the disparity image generation unit 404 copies the pixel value of the pixel (u, v) in the texture image into the pixel (u−X1, v) in the left-eye image. Likewise, it is sufficient that the disparity image generation unit 404 copies the pixel value of the pixel (u, v) in the texture image into a pixel (u−X2, v) in the left-eye image.

The disparity image generation unit 404 can generate a left-eye image by performing the above processing on all the pixels included in the distance image. Copying to a position horizontally opposed to the left-eye image results in generation of a right-eye image. To explain this in the above example, the pixel corresponding to the pixel (u−X1, v) in the left-eye image is a pixel (u+X1, v) in the right-eye image. With this, the disparity image generation unit 404 is capable of generating disparity images in which the stereoscopic effect of the object in a user's desired distance is emphasized, and thereby enables a three-dimensional display apparatus or the like to stereoscopically display the object.

As above, the three-dimensional imaging apparatus according to this embodiment has an advantageous effect that designating a distance of a scene in which the stereoscopic effect is desired to be emphasized allows converting an actual distance into a stereoscopic distance according to the congestion stereo method in a manner that physically causes no feeling of strangeness.

In other words, the three-dimensional imaging apparatus according to this embodiment can convert the distance indicated in the distance information into a stereoscopic distance so that the stereoscopic effect of the scene in the designated distance is emphasized. Consequently, even an image captured by a photographer who is not used to taking three-dimensional images can result in an image with a desired object stereoscopically emphasized therein.

Furthermore, generating an emphasized image on which a photographer can visually recognize a stereoscopic effect enables the photographer during a shooting to check in which region and in what degree the stereoscopic effect is being emphasized, which is an advantageous effect. As a result, it becomes possible to effectively improve a stereoscopic effect of a captured image.

Furthermore, the three-dimensional imaging apparatus according to this embodiment is capable of generating an emphasized image by processing a captured image so that a region where the difference between the designated distance and the stereoscopic distance is greater has more blur. In other words, the emphasized image can be generated as a two-dimensional image. Therefore, the three-dimensional display apparatus is not always needed to display the emphasized image, with the result that the structure of the imaging apparatus can be simplified, for example.

Furthermore, the three-dimensional imaging apparatus according to this embodiment is capable of generating an emphasized image by adding blur to a restored image generated by performing a restoration process on the captured image. The occurrence of a decrease in visibility of a stereoscopic effect by blur included in the captured image can therefore be reduced.

The three-dimensional imaging apparatus according to an implementation of the present invention has been described above based on the embodiment, but the present invention is not limited to the embodiment. Without departing from the scope of the present invention, the present invention includes an embodiment with some modifications on this embodiment that are conceived by a person skilled in the art.

For example, the emphasized image generation unit generates a two-dimensional image as the emphasized image in the above embodiment, but may generate three-dimensional images as the emphasized image. In this case, it is preferred that the display unit can stereoscopically display three-dimensional images. With this, a photographer can check a stereoscopic effect emphasized in the designated distance, by viewing the emphasized image stereoscopically displayed on the display unit.

Furthermore, the three-dimensional image processing unit does not always need to include the distance information obtainment unit and the disparity image generation unit. In this case, the distance conversion unit may obtain the distance information from the imaging unit, for example. Furthermore, the disparity images may be generated by the display unit.

Furthermore, although processing is performed on a per pixel basis in the various processes in the above embodiment, the processing may be performed for each region made up of pixels, for example.

Furthermore, the three-dimensional image processing unit is included in the three-dimensional imaging apparatus in the above embodiment, but may be independent of the three-dimensional imaging apparatus and provided as a three-dimensional image processing apparatus. An example of the three-dimensional image processing apparatus is described with reference to FIGS. 13 and 14.

Figure 13:
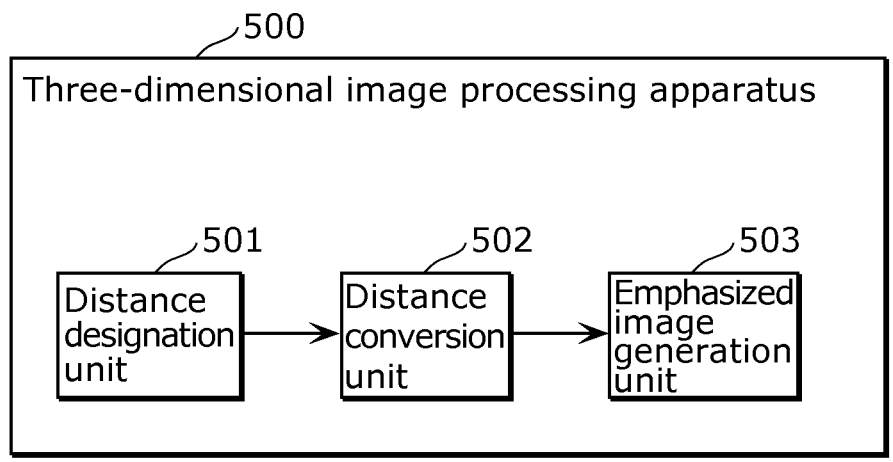
FIG. 13 is a block diagram showing a functional structure of a three-dimensional image processing apparatus according to an aspect of the present invention.
Figure 14:
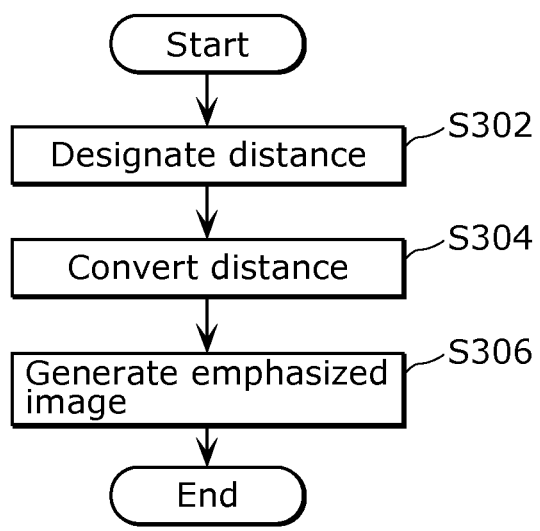
FIG. 14 is a flowchart showing a processing operation of the three-dimensional image processing apparatus according to the aspect of the present invention.

FIG. 13 is a block diagram showing a functional structure of a three-dimensional image processing apparatus 500 according to an aspect of the present invention. FIG. 14 is a flowchart showing a processing operation of the three-dimensional image processing apparatus 500 according to the aspect of the present invention. As shown in FIG. 13, the three-dimensional image processing unit 500 includes a distance designation unit 501, a distance conversion unit 502, and an emphasized image generation unit 503.

As shown in FIG. 14, the distance designation unit 501 first receives input of a designated distance that is a target distance in which the stereoscopic effect is to be emphasized (S302). Subsequently, the distance conversion unit 502 converts a distance indicated in distance information into a stereoscopic distance for generating three-dimensional images, so that a stereoscopic effect of a scene in the designated distance is emphasized (S304). Lastly, the emphasized image generation unit 503 processes the captured image based on the stereoscopic distance to generate an emphasized image which represents the stereoscopic effect to be emphasized in the designated distance (S306). Thus, the three-dimensional image processing apparatus 500 emphasizes a stereoscopic effect of the captured image in the designated distance using the distance information.

(Other Variations)

The present invention includes the following cases.

(1) The above three-dimensional image processing apparatus is specifically a computer system which includes a microprocessor, a read only memory (ROM), a random access memory (RAM), a hard disk unit, a display unit, a keyboard, and a mouse. In the ROM or the hard disk unit, a computer program is stored. When the microprocessor operates according to the computer program, the three-dimensional image processing apparatus achieves its functions. Here, the computer program is composed of command codes each indicating an instruction which is given to a computer in order to achieve a predetermined function.

(2) Part or all of the structural elements included in the above three-dimensional image processing apparatus may be provided as one system LSI (large scale integration). The system LSI is a super multifunctional LSI manufactured by integrating plural components into one chip and is specifically a computer system which includes a microprocessor, a ROM, a RAM, and so on. In the ROM, a computer program is stored. When the microprocessor operates according to the computer program, the system LSI achieves its functions.

(3) Part or all of the structural elements included in the above three-dimensional image processing apparatus may be provided as an IC card or a stand alone module that can be attached to and detached from the three-dimensional image processing apparatus. The IC card or the module is a computer system which includes a microprocessor, a ROM, and a RAM. The IC card or the module may include the above super multifunctional LSI. When the microprocessor operates according to a computer program, the IC card or the module achieves its functions. This IC card or this module may be anti-tamper.

(4) The present invention may be the method described above. Furthermore, the present invention may be a computer program which implements the method using a computer, or digital signals including the computer program.

Furthermore, the present invention may be a non-transitory computer-readable recording medium, such as a flexible disk, a hard disk, a compact disc read only memory (CD-ROM), a magneto-optical drive (MO), a digital versatile disc (DVD), a DVD-read only memory (DVD-ROM), a DVD-random access memory (DVD-RAM), a Blu-ray Disc (registered trademark) (BD), or a semiconductor memory, on which the computer program or the digital signals are recorded. Furthermore, the present invention may be the digital signals recorded on these recording media.

Furthermore, the present invention may be something which transmits the computer program or the digital signals via telecommunication lines, wireless or wired communication lines, networks represented by the Internet, data broadcasting, or the like.

Furthermore, it may be that the present invention is a computer system which includes a microprocessor and a memory, and in the memory, the above computer program is stored, and the microprocessor operates according to the computer program.

Furthermore, the program or the digital signals may be recorded on the recording medium and thus transferred or the program or the digital signals may be transferred via the network or the like, to cause another independent computer system to implement the present invention.

(5) The above embodiment and any of the above variations may be combined.

INDUSTRIAL APPLICABILITY

The three-dimensional image processing apparatus and the three-dimensional imaging apparatus according to the present invention are capable of emphasizing, in a captured image, a stereoscopic effect in a designated distance, and are available as digital still cameras, digital video cameras, computer software, and the like.

REFERENCE SIGNS LIST

10 Three-dimensional imaging apparatus
100 Imaging unit
101 Imaging device
103 Optical lens
104 Filter
105 Control unit
106 Device driving unit
200 Signal processing unit
201 Memory
202 Three-dimensional image processing unit
203 Interface unit
300 Display unit
400 Distance information obtainment unit
401, 501 Distance designation unit
402, 502 Distance conversion unit
403, 503 Emphasized image generation unit
404 Disparity image generation unit
500 Three-dimensional image processing apparatus

The invention claimed is:

1. A three-dimensional image processing apparatus which processes a captured image of a scene using distance information indicating a first distance of the scene from a camera, the three-dimensional image processing apparatus comprising:
a distance designation unit configured to receive input of a user-selected designated distance that is a target distance in which a stereoscopic effect is to be emphasized;
a distance conversion unit configured to convert the first distance indicated in the distance information into a second distance that is represented in a distance image and used for generating three-dimensional images, and to emphasize the stereoscopic effect of the scene at the designated distance by selecting a change amount of the second distance with respect to the first distance that is largest at the designated distance;
an emphasized image generation unit configured to generate a texture image based on the captured image, and to generate an emphasized image by processing the texture image to cause more blur to be included in a region where the change amount is largest, the emphasized image being an image in which the stereoscopic effect perceived by a viewer is emphasized according to the designated distance; and
a disparity image generation unit configured to calculate a shift amount of each pixel of the texture image based on the distance image, and generate a pixel-shifted image by shifting each pixel of the texture image by the calculated shift amount, to generate, as the three-dimensional images, paired stereoscopic images including the texture image and the pixel-shifted image.

2. The three-dimensional image processing apparatus according to claim 1,
wherein the emphasized image generation unit is configured to generate the texture image by performing a restoration process on the captured image using blur information to generate a restored image and to generate the emphasized image by adding more blur to a region of the restored image where the change amount is largest, the blur information indicating a feature of blur in the captured image.

3. The three-dimensional image processing apparatus according to claim 1, wherein
the disparity image generation unit is configured to generate, as the three-dimensional images based on the captured image, disparity images based on the paired stereoscopic images, the disparity images having a disparity which depends on the stereoscopic distance.

4. The three-dimensional image processing apparatus according to claim 1,
wherein the distance conversion unit is configured to convert the first distance indicated in the distance information into the second distance using a conversion expression which represents the second distance as a function of the first distance indicated in the distance information, and
a rate of change of the function in the designated distance is greater than 1.

5. The three-dimensional image processing apparatus according to claim 4,
wherein the distance conversion unit is configured to convert the first distance indicated in the distance information into the second distance using a conversion expression which gives a highest rate of change in the designated distance among conversion expressions held in advance.

6. The three-dimensional image processing apparatus according to claim 1,
wherein the three-dimensional image processing apparatus is configured as an integrated circuit.

7. A three-dimensional imaging apparatus comprising:
the three-dimensional image processing apparatus according to claim 1;
an imaging unit configured to capture an image of the scene; and
a display unit configured to display the emphasized image.

8. A three-dimensional image processing method for processing a captured image of a scene using distance information indicating a first distance of the scene from a camera, the three-dimensional image processing method comprising:
receiving input of a user-selected designated distance that is a target distance in which a stereoscopic effect is to be emphasized;
converting the first distance indicated in the distance information into a second distance that is represented in a distance image and used for generating three-dimensional images, to emphasize the stereoscopic effect of the scene at the designated distance by selecting a change amount of the second distance with respect to the first distance that is largest at the designated distance;

generating a texture image based on the captured image, and generating an emphasized image by processing the texture image to cause more blur to be included in a region where the change amount is largest, the emphasized image being an image in which the stereoscopic effect perceived by a viewer is emphasized according to the designated distance; and calculating a shift amount of each pixel of the texture image based on the distance image, and generating a pixel-shifted image by shifting each pixel of the texture image by the calculated shift amount, to generate, as the three-dimensional images, paired stereoscopic images including the texture image and the pixel-shifted image.

9. A non-transitory computer-readable recording medium having recorded thereon a program for causing a computer to execute the three-dimensional image processing method according to claim 8.

* * * * *